(No Model.) 2 Sheets—Sheet 2.

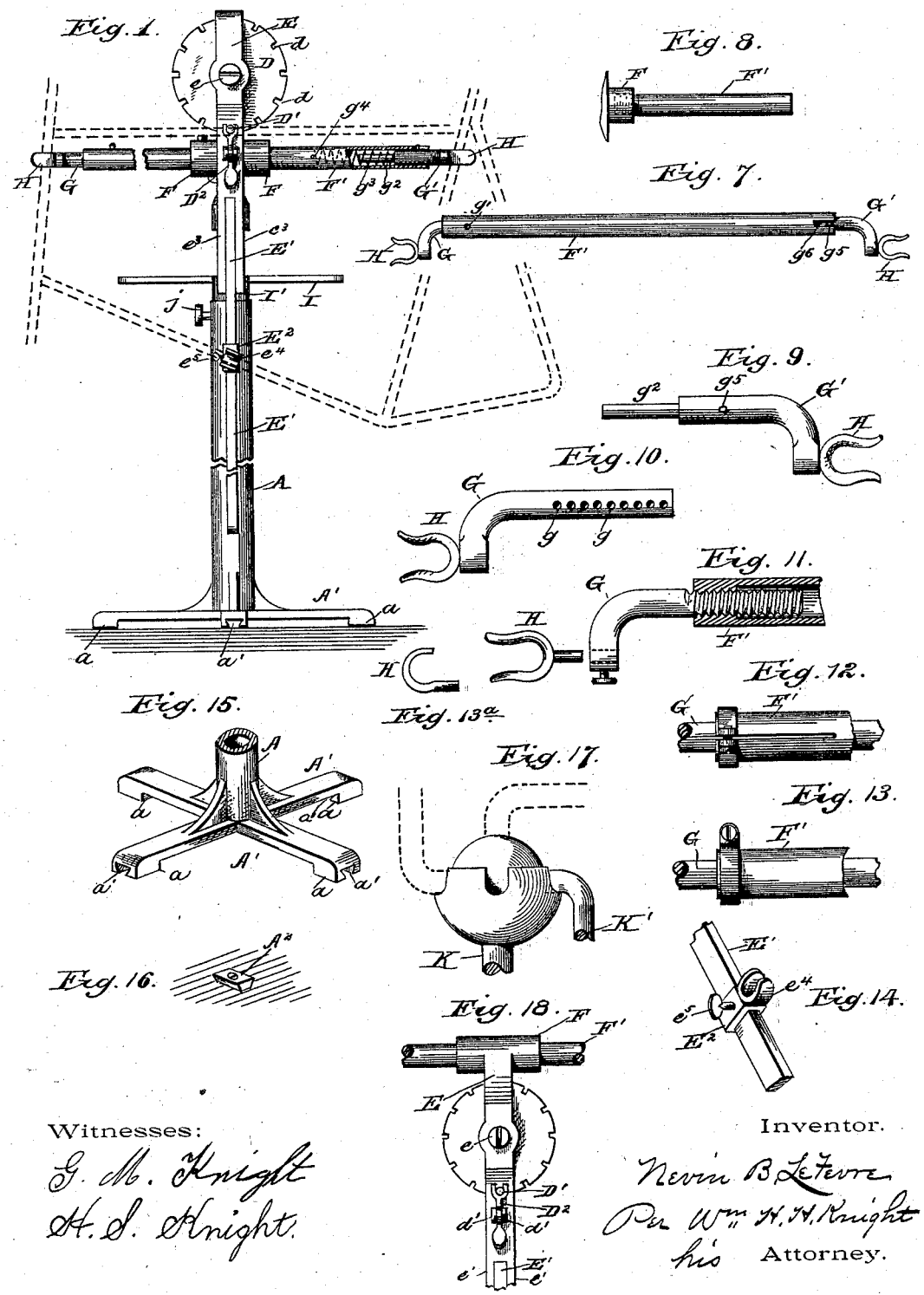

N. B. LE FEVRE.
BICYCLE STAND.

No. 578,886. Patented Mar. 16, 1897.

Witnesses:
G. M. Knight
H. S. Knight.

Inventor.
Nevin B. Le Fevre
Per Wm H. H. Knight
his Attorney.

UNITED STATES PATENT OFFICE.

NEVIN B. LE FEVRE, OF LITTLESTOWN, PENNSYLVANIA, ASSIGNOR TO ZACHARIAH K. LOUCKS, OF PHILADELPHIA, PENNSYLVANIA.

BICYCLE-STAND.

SPECIFICATION forming part of Letters Patent No. 578,886, dated March 16, 1897.

Application filed March 27, 1895. Serial No. 543,383. (No model.)

*To all whom it may concern:*

Be it known that I, NEVIN B. LE FEVRE, a citizen of the United States, residing at Littlestown, in the county of Adams and State of Pennsylvania, have invented certain new and useful Improvements in Bicycle-Stands; and I do hereby declare the following to be a full, clear, and exact description of the invention, such as will enable others skilled in the art to which it appertains to make and use the same.

My invention relates to improvements in bicycle-stands, and contemplates the provision of a device of the class named, having means for securing the bicycle-frame in position upon the stand, means for moving said bicycle into any desired position and angle to facilitate work thereon, and means for securely fastening said bicycle at any angle, all as hereinafter described, and illustrated in the accompanying drawings, wherein—

Figure 3:
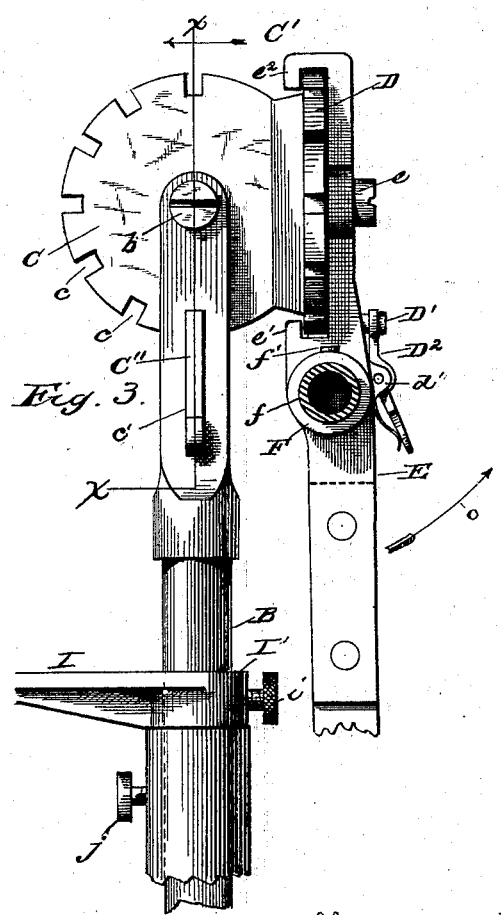
Figure 2:
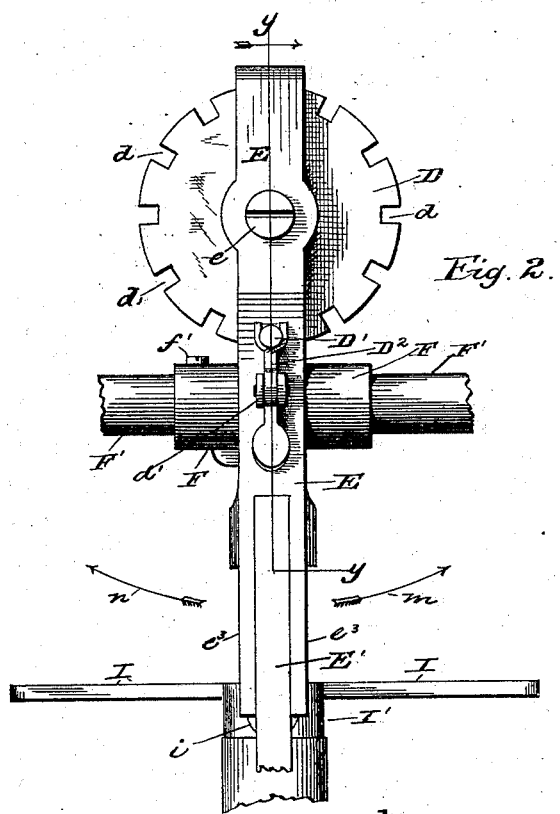
Figure 4:
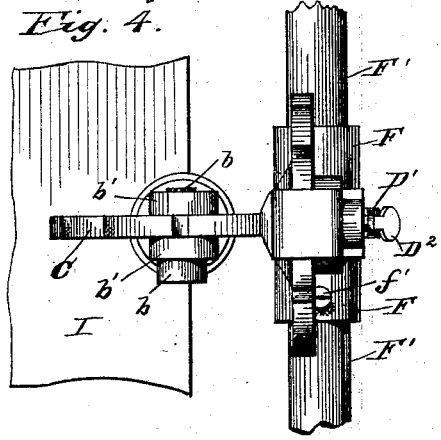
Figure 5:
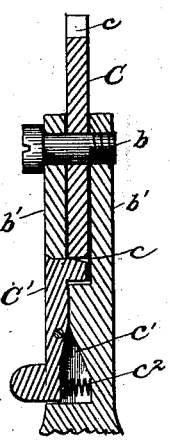
Figure 6:
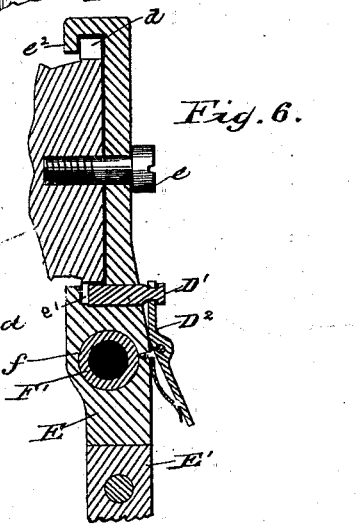

Figure 1 is a front elevation of my improved bicycle-stand and shows in dotted lines a bicycle thereon. Fig. 2 is an enlarged view of parts of the mechanism shown in Fig. 1. Fig. 3 is a side elevation of the parts shown in Fig. 2. Fig. 4 is a top plan view of Fig. 3. Fig. 5 is a vertical section taken on the line $x\ x$ of Fig. 3. Fig. 6 is a vertical section taken on the line $y\ y$, Fig. 2. Fig. 7 is a top plan view of the cross-arm and its connected bicycle-holding stirrups detached from the machine. Fig. 8 shows a modified form of connecting the cross-head to the stand. Figs. 9 and 10 represent the stirrup-holding rods, shown in Fig. 7 detached from the cross-arm. Figs. 11 to 13, inclusive, illustrate modified forms of securing the stirrup-holding rods to the cross-arm. Fig. 13$^a$ illustrates a modified form of the stirrup. Fig. 14 is a perspective view of a portion of the swinging arm or lever and shows a movable clamp upon said arm to assist in holding the bicycle in position. Fig. 15 is a perspective view of the lower part of the standard, together with its supporting legs and feet. Fig. 16 shows in perspective a floor block or clamp to be used in connection with recesses in the feet of the stand to secure the same in fixed condition to a floor. Fig. 17 shows an adaptation of the ball-and-socket joint to a bicycle-stand. Fig. 18 is a view showing the cross-arm connected to the stand above the universal joint thereof.

Referring to the drawings, wherein similar letters of reference denote similar parts, A designates a tubular standard provided at its lower end with outwardly-extending legs A', the outer ends $a$ of which are thickened to form feet and are provided upon their lower surfaces with dovetailed grooves $a'$ to engage with blocks A$^2$, which are screwed to the floor.

I provide the tubular standard A with a shaft B, which freely moves in said standard, and is provided at its upper end with a bifurcated portion to receive one of the disks C of the universal joint C'. A pivotal pin or screw $b$ holds the disk C in proper position between the legs $b'\ b'$, formed by the bifurcation of the shaft B.

I provide the disk C at its edge with a series of detents $c$, which engage a pawl C'', pivoted to the shaft B, within a recess $c'$, formed in said shaft and normally held in engagement with the detents $c$ by a spring $c^2$.

Rigidly connected with or formed integral with the disk C is a disk D, which extends at right angles to said disk C, and is provided at its outer edge with a series of detents $d$, which are engaged by a pawl D', that is connected to and operated by a spring-pressed arm D$^2$, journaled between lugs $d'$, which project from an arm E, which arm is pivoted at $e$ to the disk D at the center thereof.

I preferably extend the arm E above the upper edge of the disk D and provide said arm with hooks $e'\ e^2$, which bear upon the rear surface of said disk. (See Fig. 3.)

I preferably bifurcate the arm E at its lower end, and between the legs $e^3$ thus formed I secure the upper end of a further extension E' of said arm, which extends downward to serve in holding the bicycle-frame in position. (See Fig. 1.) To this end I provide the extension E' of the arm with a sliding clamp E$^2$, having a spring-clasp $e^4$ swiveled thereto to catch upon the frame of the bicycle. A thumb-screw $e^5$ holds the clamp E$^2$ at any desired position on the arm E'.

I provide the arm E, either at a point immediately below the disk D, as shown in Figs. 1, 2, and 3, or above said disk, as shown in Fig. 18, and upon the opposite sides of said arm, with bosses F, and provide said bosses, as also that portion of the arm E therebetween, with a cylindrical aperture or bore $f$ to receive a tubular cross-arm F', which is held against movement in said bosses by a thumb-screw f'. If desired, the cross-arm F' may be made in two sections and connected to the bosses F by a screw connection, as shown in Fig. 8.

I provide the opposite ends of the cross-arm F' with stirrup-holding rods or arms G G', having forwardly-bent outer ends, (see Figs. 7 to 11,) to which I connect stirrups or clasps H, which, if desired, may be movably connected to said rods G G', as shown in Fig. 11.

I provide one of the stirrup-holding rods G with a series of apertures $g$ (see Fig. 10) to receive a pin $g'$, which passes through an aperture formed in the cross-arm F", whereby said rod may be fixed at different degrees of projection from said arm to suit different widths of bicycles.

In lieu of the pin $g'$ and apertures $g$ the rod G may have a screw-thread cut thereon to engage a screw-thread cut in the end of the cross-arm, (see Fig. 11,) or the said cross-arm may have a slot cut in one side thereof and be provided with a clamping-band to tighten the arm on said rod G. (See Figs. 12 and 13.)

The remaining stirrup-holding rod or arm G' is provided for a portion of its length with a part $g^2$, of less diameter than the remaining part of said rod, about which is coiled a spring $g^3$, which extends into the cross-arm F' and abuts against a pin $g^4$, that passes through said cross-arm. (See Fig. 1.) A pin $g^5$, which projects from the rod or arm G' and moves in a slot $g^6$ in the cross-arm F', operates to hold said arm G' from turning in said cross-arm.

I preferably pad the stirrups H, which engage with the bicycle-frame, with leather or other suitable material to prevent damage to said frame by said stirrups.

In Fig. 13$^a$ I show a stirrup made in hook form to more securely hold the bicycle-frame in position upon the stand.

I provide my improved stand with a tool rest or table I, which is connected with a collar I', that is placed upon the shaft B and rests upon the tubular standard A. A thumb-screw $i$ in said collar serves to hold it in different adjustments upon the shaft B, and consequently to hold said shaft at any degree of elevation in the standard A. To hold the shaft B from turning in the standard, I provide a thumb-screw $j$, which passes through one side of said standard near its head and bears upon the shaft.

By reference to the drawings it will be readily understood that the swinging arm E E' and its contained bicycle may be swung into any position or angle with the standard A, (see Figs. 2 and 3,) from the former of which it will be seen that said arm may be swung from side to side, as indicated by the arrows $n$ and $m$, and held at any desired degree of elevation by the engagement of the pawl D' with the detents $d$ of the disk D, while from Fig. 3 it will be equally apparent that said arm E E' may be swung outward from the standard, as indicated by the arrow $o$, and held at any desired angle with said standard by the engagement of the pawl C" with the detents $c$ of the disk C, it thus being apparent that a bicycle on the stand may be easily and quickly swung into any desired position to facilitate repairs thereon.

In Fig. 17 I show a ball-and-socket joint connecting a shaft K with a swinging arm K'. This latter-described form of joint may be used, if desired, in lieu of the disks C D, although inferior in action to said disks.

Other forms of a universal joint between the standard and swinging arm may be employed and fall within the spirit of my invention.

Having thus described my invention, I claim and desire to secure by Letters Patent—

1. In a bicycle-stand, a tubular standard, a shaft, moving freely in said standard, an arm having connections to hold a bicycle-frame, and disks, rigidly connected to each other at right angles, and hinged to said shaft, and said arm, whereby the latter, may move in any direction upon the former, substantially as described.

2. In a bicycle-stand, a tubular standard, a shaft therein, an arm having a cross-head, to receive a bicycle-frame, disks rigidly connected at right angles to each other, and provided with peripheral detents, hinged connections between said disks, shaft, and arm, and spring-pressed pawls upon said shaft, and said arm to engage the detents in said disks, substantially as described.

3. The combination in a bicycle-stand, of circular disks, rigidly connected together at right angles to each other, and provided with peripheral detents, with a fixed standard, and an arm having a cross-head, provided with stirrups to hold a bicycle-frame, and spring-pressed pawls, connected to said standard, and to said arm, to engage the detents in said disks, substantially as described.

4. In a bicycle-stand, the combination of a standard, having feet provided with dovetail grooves to engage floor-plates, a shaft within said standard, a collar upon said shaft having a tool rest or table connected thereto, and a set-screw therein to engage said shaft, an arm having a cross-head, provided with stirrups, and with a sliding hook to hold a bicycle-frame, a universal joint, having hinged connections to said standard, and said arm, and means to hold said arm, at any angle with said standard, substantially as described.

In testimony whereof I have affixed my signature in presence of two witnesses.

NEVIN B. LE FEVRE.

Witnesses:
HENRY E. COOPER,
MARGARET V. COOPER.